Feb. 6, 1940.   R. D. EVANS   2,189,630
HIGH SPEED PRESETTING RELAY
Filed Jan. 28, 1938
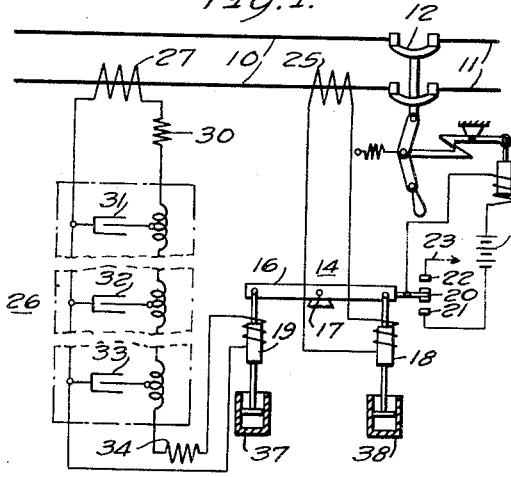
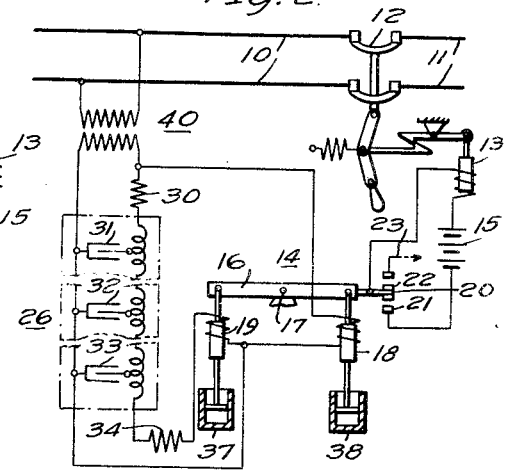
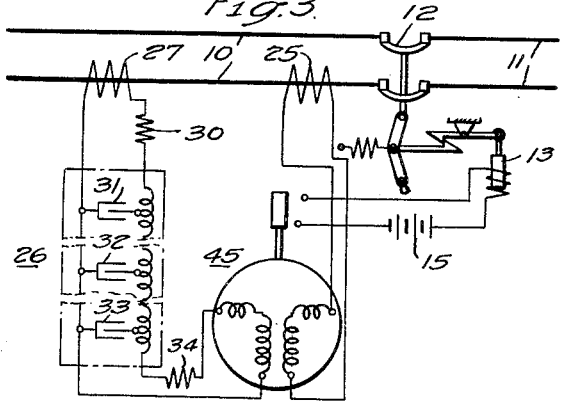
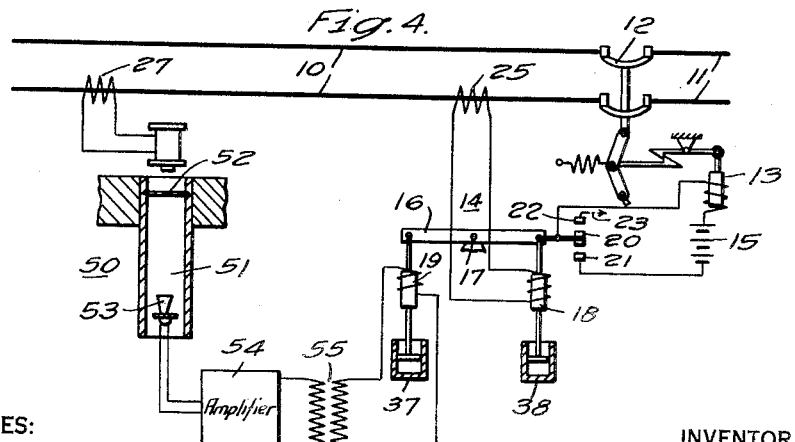
WITNESSES:
E. A. McCloskey
J. W. Foster
INVENTOR
Robert D. Evans.
BY O. B. Buchanan
ATTORNEY Patented Feb. 6, 1940

2,189,630

UNITED STATES PATENT OFFICE 2,189,630

HIGH SPEED PRESETTING RELAY

Robert D. Evans, Pittsburgh, Pa., assignor to Westinghouse Electric & Manufacturing Company, East Pittsburgh, Pa., a corporation of Pennsylvania Application January 28, 1938, Serial No. 187,476

14 Claims. (Cl. 175—294)

This invention relates to relays and relay systems, and particularly to pre-setting systems for relays, whereby the operating point of the relay may be quickly and automatically set according to predetermined or circuit conditions.

The primary object of my invention is to provide a relay system in which the relay may be adjustably controlled automatically and at high speed, according to changing conditions in a circuit, so that the relay may be operative to respond at very high speed upon the occurrence of a condition of a predetermined type, in the circuit or system to which the relay is connected.

Another object of my invention is to provide a relay system for an alternating-current circuit, whereby the rate of change of the value of an electrical quantity may be measured and ascertained, and employed to control the operation of the relay.

It is frequently desirable to be able to distinguish between normal high load conditions in a circuit and abnormal conditions irrespective of the load conditions at that time in order to control an interrupter for the circuit. When the system is heavily loaded but conditions are normal, operation of the interrupter is not, of course, desired. Where an abnormal condition occurs, however, such as a fault on the circuit, the operation of the interrupter may be desired, even though the fault current or fault energy may be well within the load capacity of the system.

In the usual operation of electrical systems, normal load conditions vary rather gradually. Fault occurrences, however, are usually such as to change the circuit conditions very rapidly. If a protective relay for the circuit is to distinguish between normal load conditions and faulty conditions, and is to provide proper and adequate protection upon the occurrence of the faulty conditions, it is essential that the relay be able, first, to distinguish between high loading normal conditions and a faulty condition; second, to detect the occurrence of the faulty condition; and, third, to control the circuit or system in accordance with the nature of the faulty condition.

In order to provide maximum flexibility in the control of the system by the relay, I conceive it to be highly desirable to permit the relay to adjust its own operating point in accordance with the changing load current conditions of the circuit, so that the relay may readily and quickly detect a change in the current conditions, and so it may determine whether such change is a normal circuit change or an abnormal change.

In order to provide such relay sensitivity and selectivity, I provide the relay with one winding which is the operating winding, and connect that operating winding to the circuit so that it will be energized in accordance with the instantaneous value of the current or of the voltage of the system at the measuring instant. A second winding is provided to serve as a control winding and is disposed to counteract and to counterbalance the main operating winding under normal conditions. The second or control winding is connected to the system through an energy-delay network that is arranged to energize the control winding continuously, but in accordance with the value of the current or of the voltage in the system, as that value occurred a certain time interval prior to the instant when the operating winding of the relay was being energized. In this manner the operating winding is energized according to the immediate value of the current or of the voltage; and the control winding is energized according to a previous value of the current or of the voltage as it occurred at a predetermined previous time interval. That interval may be one-half cycle or one or more cycles, as desired.

By such energization, the two windings, when differentially related, will measure not only the difference in the value of the current or of the voltage of the circuit from cycle to cycle, but will also serve to measure, by means of such difference, the rate of change of the current or voltage over the fixed selected time interval.

An energy-delay network of one type for the control winding may be an electrical network of reactors and condensers, connected between the circuit and the relay, and suitably arranged to establish the time delay desired. In order to avoid distorting the delayed current or voltage curve, the electrical network should preferably have the same impedance constants as the circuit to which it is connected.

An energy-delay network of another type for the control winding may be an acoustic energy-transmitter, such as an air column disposed to be vibrated by the circuit current, and an electric pick-up vibrated by the air column to generate an electromotive force to be used to control the energization of the control winding of the relay according to the circuit current or voltage. Here again, to avoid distortion, the air column should be designed to be free of its natural frequency within the range of influence of the probable circuit conditions.

Several simple circuits showing the arrangement of the various elements of a relay and the circuit connections in order to utilize the principle of this invention are illustrated in the accompanying drawing, in which:

Figure 1 is a diagram of a simple circuit arrangement in which a relay of the balanced-beam type is energized in accordance with the value of current in the circuit at two spaced time intervals;

Fig. 2 is a diagrammatic view of a similar circuit arrangement in which the voltage rather than the current of the circuit is measured;

Fig. 3 is a diagram of a circuit employing the principles of the system of Fig. 1 in connection with a ratio type induction relay; and Fig. 4 is a schematic diagram of a system in which an acoustic time-delay circuit or system is used to control the energization of the control winding of a relay such as shown in Fig. 1.

As shown in the accompanying drawing, and particularly in Fig. 1, an electric system, including a supply circuit 10 and a load circuit 11, is provided with a circuit interrupter 12 to connect, or to disconnect, the two circuits 10 and 11 according to the current conditions. The circuit interrupter 12 is provided with a trip coil 13, the energization of which is controlled by a relay 14 and a source of energy 15, illustrated simply as a battery.

The relay 14 comprises a balanced beam 16, illustrated as being mounted upon a simple pivot 17 and provided with an operating winding 18 and a control winding 19. When the relay 14 is operated according to the difference in energization between the two windings 18 and 19, the balanced beam 16 operates a contact member 20 to engage either of two contacts 21 or 22, to control the trip coil circuit, or to control another external circuit through the conductor 23. If desired, both contacts 21 and 22 may be connected together.

The operating winding 18 of the relay is connected to, and is energized from, a current transformer 25 connected in the supply circuit 10. The control winding 19 of the relay is connected to an electrical delay network 26, which, in turn, is connected to, and energized from, a second transformer 27.

The delay network 26 is illustrated as comprising a resistor 30, and several reactor and condenser combinations 31, 32, 33, and another resistor 34 similar to resistor 30.

The delay network 26, thus energized from the current transformer 27, is designed to provide a time delay of a predetermined interval, which may correspond to a fraction of a cycle or to more than a cycle between the time of energization of the network from the current transformer 27 and the time when that energy is transferred from the network to the relay winding 19.

The energy from the other current transformer 25, however, is supplied to the operating winding 18 of the relay instantly and represents instant energy.

The two relay windings 18 and 19 are thus progressively and continuously energized by instantaneous current values progressively and continuously occurring at definitely spaced time intervals.

Both windings 18 and 19 act upon movable elements connected to the balanced beam 16. Both movable elements may be provided with dash-pots or corresponding time delay elements 37 and 38. If a current change occurs that is due to a normal load increase or decrease, the operating winding 18 will tend to operate the relay but this will be sufficiently retarded by the dashpot, or other equivalent retarding device, for a sufficient time interval to permit the control winding to be energized to balance the operating action. As the energization of the two relay windings becomes balanced, due to the fact that the load conditions are normal, the relay will resume its neutral position.

If, however, a fault should occur, the abnormal increase in current value causes the operating winding 18 to act with much greater force and more quickly with the result that relay 14 becomes unbalanced causing engagement of the contacts 20 and 21, for example, and corresponding opening of the circuit interrupter 12. This circuit-opening operation due to fault currents will take place regardless of the value of the load current at the time, be it high or low. However, changes in load current will not cause this circuit-opening operation since increments of load current are usually not as abrupt as those resulting from the application of fault currents, and even if applied suddenly will not cause operation of the relay 14 because the magnitudes of the increments due to load changes are considerably less than the magnitudes of fault currents that might be superposed on the load current.

Thus, by means of the arrangement that is illustrated, the control winding 19 will always be progressively energized according to the value of current that existed in the circuit at a short time interval before the immediate instant when the operating winding 18 is being energized. The control winding 19 will function automatically to adjust and pre-set the operating point of the relay 14 in accordance with the changes in the load current and independently of its magnitude; but with a suddenly applied fault current the operating winding 18 causes operation of the relay before winding 19 has had an opportunity to adjust and pre-set the operating point of the relay.

Thus the relay will always be ready to detect an abnormal circuit condition irrespective of the circuit loading at any time since it will be instantaneously, automatically and continuously responsive to fault currents irrespective of the circuit loading. Its operation is therefore responsive only to an abnormal condition whether the circuit is lightly or heavily loaded.

In order that the control winding 19 may be energized in true accordance with the circuit current, the network 26 should be free of any distorting influences.

It will be appreciated that if the two windings 18 and 19 are permitted to actuate their associated elements without the restraint of the dash-pots 37 and 38, the relay 14, that is, the movable beam 16 will respond to the instantaneous rate of change of the current during the time interval of delay introduced by the network 26. When the dash-pots are used, however, the effect of each winding becomes an aggregate about the time instant of measurement, and the resultant effect is to measure the average rate of change of the current within the time interval fixed by the network.

In Fig. 2, I have shown a similar arrangement, except that the operating winding of the relay and the network for the control winding of the relay are energized from a potential transformer 40. In this case only one transformer is necessary to energize both the operating winding and the network with the control winding.

This relay responds to immediate voltage variations, and it may be utilized for quick control of the circuit breaker of the circuit, or for quick connection, for example, of an oscillograph to the main circuit to record the abnormal condition.

In Fig. 3, I have illustrated an arrangement similar to that of Fig. 1, except that an induction relay 45 is employed to provide a ratio differential between the energizing efforts of the transformer 25 and of the network 26, whereby an exponential value of the differential may be obtained to provide a measurement that is a function of the rate of change of the current in the circuit as distinguished merely from a difference in the current values. The induction type differential relay 45 may be of any suitable type.

By means of the arrangement illustrated, when applied to a relay, the relay may be automatically and instantaneously responsive to fault currents, but pre-set so that its operating point will be always adjusted according to the immediately preceding normally prevalent circuit conditions.

In Fig. 4, I have illustrated a modified time delay system for controlling the energization of the load pre-setting winding of the relay.

The time delay is procured principally by an air column 51 that transmits energy from a motor diaphragm 52 to a microphone detector or pickup 53. The microphone is vibrated by the air column and controls a circuit to an amplifier 54 that feeds a transformer 55 that energizes the control pre-set winding 19 of the relay.

To avoid distortion, the air column is selectively proportioned to be free of inherent resonance at any effective frequency likely to be encountered in the circuit. The circuit should similarly be free of distorting influences.

The energization of the pre-setting winding 19 is thus controlled by the acoustic system with suitable adjustments according to the value of the circuit current that occurred in the circuit prior to the immediate value of the current, by the time interval dependent upon the time-delay constants of the acoustic system.

The use of a delay circuit with vacuum tube amplifiers permits the use of a cheaper network. The loss may be higher but high fidelity of waveform is retained and the low amplitude of the derived effect amplified.

The application of the principles of this invention are not restricted to the control of a relay but may be similarly applied to any type of electro-responsive device that is energized from the circuit. My invention is, therefore, not limited to the applications that are illustrated nor to the specific arrangement of the elements as shown since various changes and modifications may be made without departing from the spirit and scope of the invention as set forth in the appended claims.

I claim as my invention:

1. In an alternating current system, the combination with an electro-responsive device and means connecting the device to the system to energize the device in accordance with the instantaneous value of an electrical quantity of the system, of means for modifying the responsiveness of the device according to a relation between the immediate instantaneous value of the quantity and a previous instantaneous value of that quantity, said means including means energized from the circuit by said quantity, and time-delay means between the energized means and the modifying means.

2. In an alternating current system, the combination with an electro-responsive device and means connecting the device to the system to energize the device in accordance with the immediate instantaneous value of an electrical quantity of the system, of auxiliary acoustic energy-delay means connected between the system and the device to selectively energize the device according to the value attained by said quantity at a preceding time interval, and means controlled according to the relationship of the two energizing values.

3. In an alternating current system, the combination with an electro-responsive device and means connecting the device to the system to energize the device in accordance with the immediate instantaneous value of an electrical quantity of the system, of an electrical energy-storage network connected between the system and the device to selectively and immediately energize the device according to the value attained by said quantity at a preceding time interval, and means controlled by the device according to the relationship of the two simultaneous energizing values.

4. In an electrical system, the combination with a relay connected to the system to be energized therefrom according to the immediate value of a selected variable recurring electrical quantity, of means for pre-setting the relay to control its operation according to the extent of variation of the immediate degree of energization from the degree of energization at a preceding time interval, said means comprising means for restraining the normal tendency of the relay to respond to the quantity, and energy-delay means energized from the system and operative to transmit a delayed value of said quantity to the restraining means.

5. In an electrical system subject to variable load conditions and fault conditions, the combination with a relay connected to the system to be energized therefrom according to the value of a selected variable recurring electrical quantity, of means for pre-setting the operating point of the relay according to the change in the value of said quantity from cycle to cycle and to distinguish between normal load conditions and fault conditions, of means for measuring two time-spaced values of said quantity, means energized by said measured values of said quantity, and means responsive to the differential effects of said measured values of said quantity for controlling the operation of the relay.

6. In an electrical system, the combination with an electro-responsive device, of means for controlling the electro-responsive device according to the rate of change of the value of an electrical quantity of the system, said means comprising one means energized from the system and responsive to the progressive instantaneous value of said quantity, and a second means energized from the system and responsive to the progressive instantaneous value of said quantity as it occurred at a prior instant of fixed interval preceding the instantaneous measurement, and means operatively and functionally disposed between the system and the second means for introducing the delay factor corresponding to the pre-fixed interval between the measured values.

7. In an electric system, the combination with a circuit interrupter for the circuit, of a current relay to be energized from the circuit to control the operation of the interrupter upon occurrence of short-circuit conditions, said relay comprising an electro-responsive element progressively responsive to the instantaneous value of the current of the circuit, and a cooperating load-presetting means progressively responsive to the circuit current and operative to establish a differential control function in the relay according to the value of the load current in the circuit at an instant preceding the immediate instant by a predetermined interval.

8. In an electric circuit, an electro-responsive relay actuated by the resultant action of two windings, a current transformer for supplying energy from the circuit to one winding according to combined load and fault currents, and means including a second current transformer and energy-delay means to retardedly supply energy from the circuit to the other winding according to the load current immediately prior to the application of said fault current.

9. In an alternating-current system, the combination with a circuit interrupter, of means energized from the system for controlling the interrupter according to the rate of change of the current in the system within a continuously progressively time advancing time interval, said means comprising one means responsive to the instantaneous value of the system current, a second means responsive to the value of the system current at a preceding interval, and energy-delay means for controlling the energization of the second means from the system according to a delayed measurement of the value of the current at the beginning of said interval.

10. In an electrical relaying system for an electrical circuit, in combination, an electro-responsive device connected to said system responsive to the instantaneous value of an electrical quantity in said circuit, auxiliary means responsive at substantially any particular instant to the same quantity as it occurred at a previous time-spaced instant, and means operable by the resultant simultaneous responsive action of said electro-responsive device and said auxiliary means.

11. In an electrical relaying system for an electrical circuit, a pair of electro-responsive devices, connection means to apply instantaneous values of an electrical quantity of said circuit to one of said devices, connection means to apply, after a time-delay, the said instantaneous values of the said electrical quantity to the other of said devices, and means to combine the simultaneous responses of both said devices.

12. In an electric circuit, the combination with a circuit interrupter for the circuit, of a current relay to be energized from the circuit to control the operation of the interrupter upon occurrence of short-circuit conditions irrespective of load conditions, said relay comprising an electro-responsive element progressively responsive to the instantaneous value of the current of the circuit, and a cooperating load-presetting means, and energy transfer means disposed between said circuit and said presetting means, for retardedly transferring said instantaneous value of said current of said circuit to said load-presetting means to render said load-presetting means, progressively responsive to the circuit current and operative to establish a differential control function in the relay according to the value of the load current in the circuit as retardedly applied to it.

13. In a relaying system for an electrical circuit subject to wide load variations and fault conditions, a relay comprising an operating winding and a control winding, means to energize said operating winding in accordance with instantaneous values of an electrical quantity in said circuit whereby to tend to operate said relay, means to retardedly energize the said control winding in accordance with the said instantaneous values of said electrical quantity in said circuit, said relay having mechanism for combining the simultaneous effects of said control winding and said operating winding.

14. In an electrical control circuit for an electrical energy supply circuit, a differential relay to be energized in accordance with voltage conditions in said circuit, said relay comprising an operating winding and a control winding opposing said operating winding, means to energize said operating winding in accordance with instantaneous values of a voltage derived from said circuit, means to retardedly energize the said control winding in accordance with the said instantaneous values of said voltage, said relay having mechanism for combining the simultaneous effects of said control winding and said operating winding.

ROBERT D. EVANS.